United States Patent
Reibel et al.

(10) Patent No.: US 11,349,254 B2
(45) Date of Patent: May 31, 2022

(54) HINGED STRAIN RELIEF BACKSHELLS, CABLE ASSEMBLIES AND METHODS FOR STRAIN RELIEF

(71) Applicant: Bell Helicopter Textron Inc., Fort Worth, TX (US)

(72) Inventors: Patrick David Reibel, Paradise, TX (US); Jeremy William DeWaters, Hummelstown, PA (US); Matthew Ryan Carr, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 214 days.

(21) Appl. No.: 15/913,266

(22) Filed: Mar. 6, 2018

(65) Prior Publication Data

US 2019/0280427 A1    Sep. 12, 2019

(51) Int. Cl.
  *H01R 13/58*    (2006.01)
  *H01R 13/59*    (2006.01)
  *H01R 43/20*    (2006.01)

(52) U.S. Cl.
  CPC ......... *H01R 13/5804* (2013.01); *H01R 13/59* (2013.01); *H01R 43/20* (2013.01)

(58) Field of Classification Search
  CPC ............ H01R 13/5845; H01R 13/5841; H01R 13/595
  USPC ........................................................ 439/470
  See application file for complete search history.

(56) References Cited

U.S. PATENT DOCUMENTS

| | | | | |
|---|---|---|---|---|
| 3,349,364 A | * | 10/1967 | Stauffer | B29C 70/00 439/458 |
| 3,638,169 A | * | 1/1972 | Caveney | H01R 13/5804 439/471 |
| 5,178,559 A | * | 1/1993 | Mello | H01R 13/512 439/472 |
| 5,435,760 A | * | 7/1995 | Miklos | H01R 13/516 285/92 |
| 6,196,865 B1 | * | 3/2001 | Ruffel | H01R 13/56 439/470 |
| 6,935,886 B2 | * | 8/2005 | Hoch | H01R 9/032 439/462 |
| 7,485,806 B1 | * | 2/2009 | Gretz | H02G 3/0666 174/135 |
| 7,862,369 B2 | * | 1/2011 | Gimenes | H01R 13/5812 439/446 |
| 8,025,525 B2 | * | 9/2011 | Krueger | H01R 13/5812 439/446 |

(Continued)

*Primary Examiner* — Phuong K Dinh
(74) *Attorney, Agent, or Firm* — Fogarty LLP

(57) ABSTRACT

A hinged strain relief backshell, selectively disposed about a cable, adjacent to a cable connector for selective assembly with the connector, includes a first integral semi-cylindrical backshell half and a second integral semi-cylindrical backshell half second hinged to the first integral backshell half. The integral semi-cylindrical backshell halves configured to be to be selectively disposed about the cable with one another. Each integral semi-cylindrical backshell half defining complementary half-threads defined by the respective backshell half and corresponding wrench flats defined in an outside surface portion of each backshell half. At least one of the integral semi-cylindrical backshell halves defining at least one strain clamp ear portion extending from a connector distal portion of the backshell half for retraining the cable at least in a direction parallel to the cable.

14 Claims, 7 Drawing Sheets

(56) References Cited

U.S. PATENT DOCUMENTS

| | | | | |
|---|---|---|---|---|
| 8,435,066 B2* | 5/2013 | Myong | ............ | H01R 13/65912 |
| | | | | 439/452 |
| 8,545,257 B2* | 10/2013 | Pedruzzi | ............ | H01R 13/5829 |
| | | | | 439/470 |
| 9,106,068 B2* | 8/2015 | Barna | ................ | H02G 3/32 |

* cited by examiner

HINGED STRAIN RELIEF BACKSHELLS, CABLE ASSEMBLIES AND METHODS FOR STRAIN RELIEF

TECHNICAL FIELD

The present disclosure is generally in the fields of electronics and electrical systems and relates specifically to wire harness connector strain reliefs, particular wire harness connector strain reliefs configured for use in aircraft.

BACKGROUND

Wire harnesses often utilize a backshell. Tension applied to an electrical cable may cause unplugging of a connector on the end of the cable from another connector, or the like. Also, tension in a multi-element electrical cable may cause uncoupling of individual cable elements from the connector, which may result in loss of data, power, etc. Similarly, bending of a multi-element electrical cable may cause not only uncoupling of individual cable elements from the connector, but may cause shorting of individual cable terminals within the connector, or the like. Typically, a strain relief backshell, or the like is used to relive cable tension and/or bending that may otherwise result in separation of cable element wires from a connector assembly, shorting of wires within a cable connector assembly, etc.

Strain relief backshells typically have a cylindrical, connector-proximal portion that is secured to the connector, such as by being threaded onto an outer portion of the connector. Such typical backshells also have clamp ears, extending distal from the connector-proximal portion, along a (short) length of the cable. The clamp ears typically define a means for retaining a clamp around (i.e. on) the cable, spaced apart from the connector, such as holes defined in the ears and clamp plates, adapted to capture the cable between them are disposed at a distal end of the ear portions, away from the connector. Fasteners (i.e. screws or bolts) pass through holes defined in one or the other of the clamp plates, through the holes defined in the distal end of the ears, and then through corresponding holes on the other clamp plate, to be secured and tensioned by a nut, or the like, tightened onto each fastener. Thereby, the cable is clamped to the backshell, such that when tension is applied to the cable, the tension is transferred to the backshell, rather than to the connector. Transmission of strain on the cable to the backshell maintains some degree of slack, or at least an initial (low) level of tension, in the cable, preventing unplugging of the connector, uncoupling of individual cable elements within the connector, or the like, thereby alleviating chances of loss of data, loss of power, shorting of cable elements, etc.

Typical strain relief backshells are available for any number of applications, such as for use in conjunction with multi-element cables, coaxial cables, etc. and in various configurations and cable-corresponding sizes. However, traditional backshells of one solid piece are threaded onto the back of a connector. When a backshell is broken, or its replacement is otherwise called for, the entire connector must be removed in order to replace just the backshell. This adds significantly to maintenance burdens and increases the likelihood of additional damage to the cabling, related circuitry, other nearby cabling, or the like. One prior solution is use of a two-piece strain relief backshell assembly made in two halves to allow the backshell to be fastened on either side of a cable. However, during installation, and/or removal, of such a backshell, it may be difficult to retain the two pieces, much less retain the two pieces in proper position or alignment during installation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to hinged connector strain relief backshells, that is to connector strain relief backshells that are hinged. Thus, a cable assembly may, in addition to the cable, include a connector disposed on an end of the cable and a hinged strain relief backshell configured to be selectively disposed about the cable and selectively assembled with the connector. The cable may be an electrical cable, having an electrical connector (e.g. a multi-element electrical cable comprising a connector providing a conductor for each cable element). The hinged strain relief backshell may comprise a first integral semi-cylindrical backshell half configured to be selectively disposed about the cable and a second integral semi-cylindrical backshell half hinged to the first integral backshell half and configured to be to be selectively disposed about the cable with the first backshell half, as well as being configured to be secured to the first integral backshell half.

To this end, the first integral semi-cylindrical backshell half and the second integral semi-cylindrical backshell half may define an axial connector and cable receptive central opening extending from a connector-proximal end of the hinged cable strain relief backshell to a connector distal end of the hinged cable strain relief backshell.

The first backshell half may include half-threads defined by the first backshell half, wrench flats defined in an outside surface portion of the first backshell half, and at least one strain clamp ear portion extending from a connector distal portion of the first, and/or second, backshell half. The second integral backshell half may include half-threads defined by the second backshell half, complementary to the half-threads defined by the first backshell half, and second wrench flats, corresponding with the first backshell wrench flats, also defined in an outside surface portion of the second backshell half.

The half threads may be respective complimentary half-threads defined on an inner surface the respective first and second backshell halves. Alternatively, or additionally, the half threads may be respective complimentary half-threads defined on an outer surface the respective first and second backshell halves.

Each semi-cylindrical backshell half may define a respective hinge half portion extending generally normal to the respective semi-cylindrical backshell half, extending from a first end of each semi-cylindrical backshell half. Each of these hinge half portions may define at least one hinge pin receptive orifice extending generally parallel to an axis of the respective semi-cylindrical backshell half. Hence, the hinged cable strain relief backshell may employ a hinge pin deployed through the hinge pin receptive orifices, hinging the backshell halves to each other.

Each of the first and second semi-cylindrical backshell halves may define a respective corresponding closure flange portion extending generally normal to the respective semi-cylindrical backshell half from a second end of the respective semi-cylindrical backshell half. These closure flanges may each define a fastener receptive orifice extending generally tangent to the respective semi-cylindrical backshell half correspondingly aligned and configured to receive a fastener when the backshell halves are closed.

A clamp plate may be selectively secured, by at least one fastener, to the strain clamp ear portion(s), capturing and securing the cable, to restrain motion of the cable in a direction parallel to the cable. Alternatively, at least one of the backshell halves may define an integral strain clamp saddle portion extending from or between strain clamp ear portion(s). For example, the first backshell half may have a first integral strain clamp saddle portion extending from, or between strain clamp ear portion(s) extending from the connector distal portion of the first backshell half, and/or the second backshell half further may have a second integral strain clamp saddle portion extending from, or between strain clamp ear portion(s) extending from the connector distal portion of the second backshell half.

To install the present hinged strain relief backshell, removal of an existing (strain relief) backshell may be called for, prior to disposing the first and second backshell halves around the cable. To remove an existing backshell, the existing cable strain relief backshell may be unclamped from the cable, unscrewed from the connector and then removed from around the cable. If the existing cable strain relief backshell is not hinged, this removal may comprise cutting the existing cable strain relief backshell to allow removal. However, if the existing cable strain relief backshell is hinged, removal may call for unsecuring a first semi-cylindrical backshell half and a second semi-cylindrical backshell half of the existing hinged backshell from each other, then the existing backshell is hinged open, prior to removing the existing backshell from around the cable.

Installation of the present hinged strain relief backshell may be carried out by disposing the first and second semi-cylindrical backshell halves hinged to each other around the cable, adjacent to a cable connector disposed on an end of the cable. The first semi-cylindrical backshell half or the second semi-cylindrical backshell half is rotated about the hinge joining the first and second backshell halves, around the cable. The first semi-cylindrical backshell half and the second semi-cylindrical backshell half are secured together, around the cable, providing a joined backshell. The joined backshell is then assembled to a cable connector disposed at the end of the cable. The joined backshell may be assembled with the cable connector by screwing the joined backshell onto and/or into the cable connector and tightening the backshell to the cable connector by engaging complementary wrench flats defined in an outside surface portion of each of the first and second semi-cylindrical backshell halves.

Motion of the cable relative to the connector is restrained, at least in a direction parallel to the cable, by clamping the cable in conjunction with at least one integral strain clamp ear portion extending rearward, and/or at an angle, from at least one of the backshell halves, such as trough use of a strain relief plate and/or at least one integral strain clamp saddle portion extending from at least one integral strain clamp ear.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
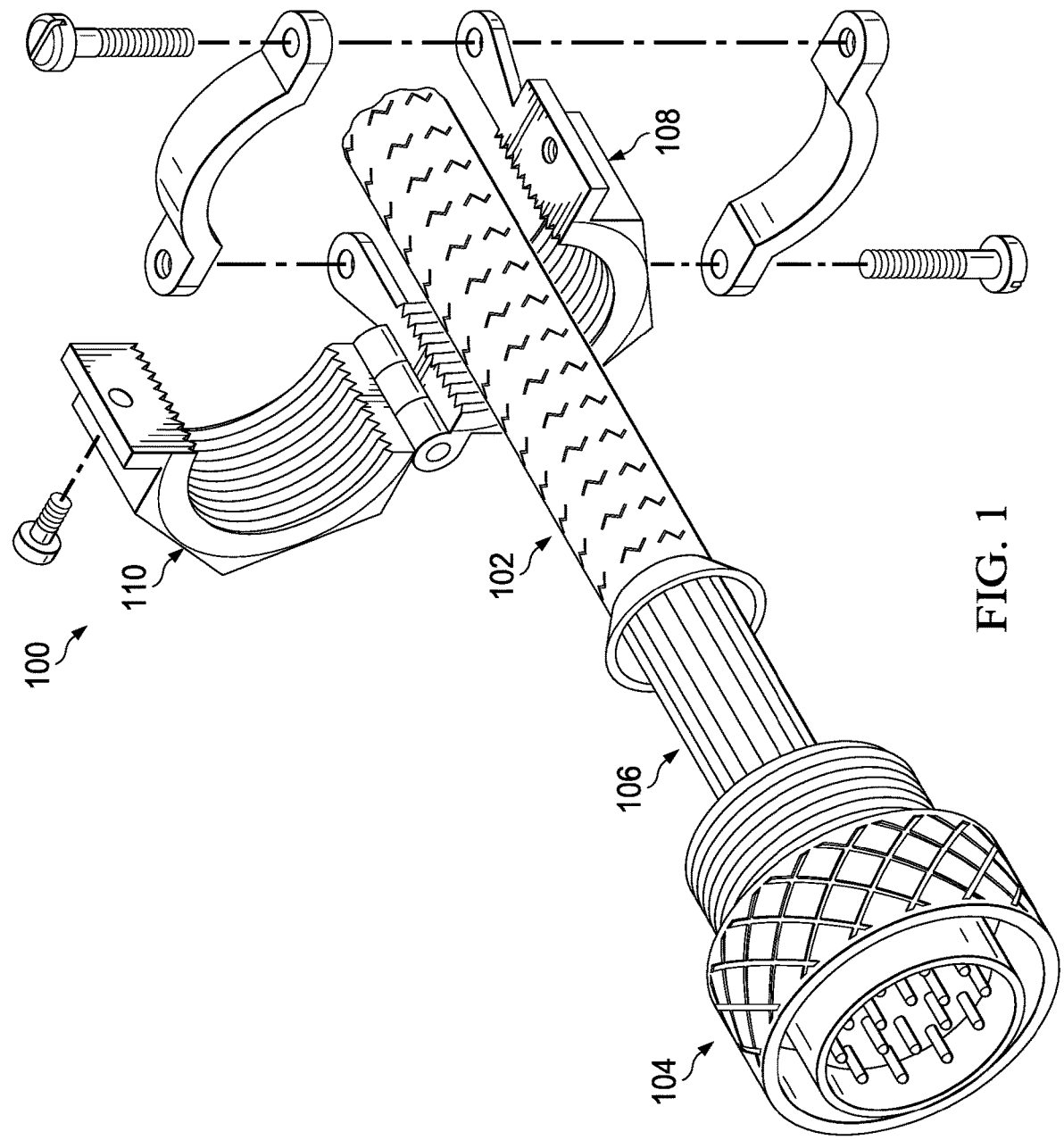
Figure 2:
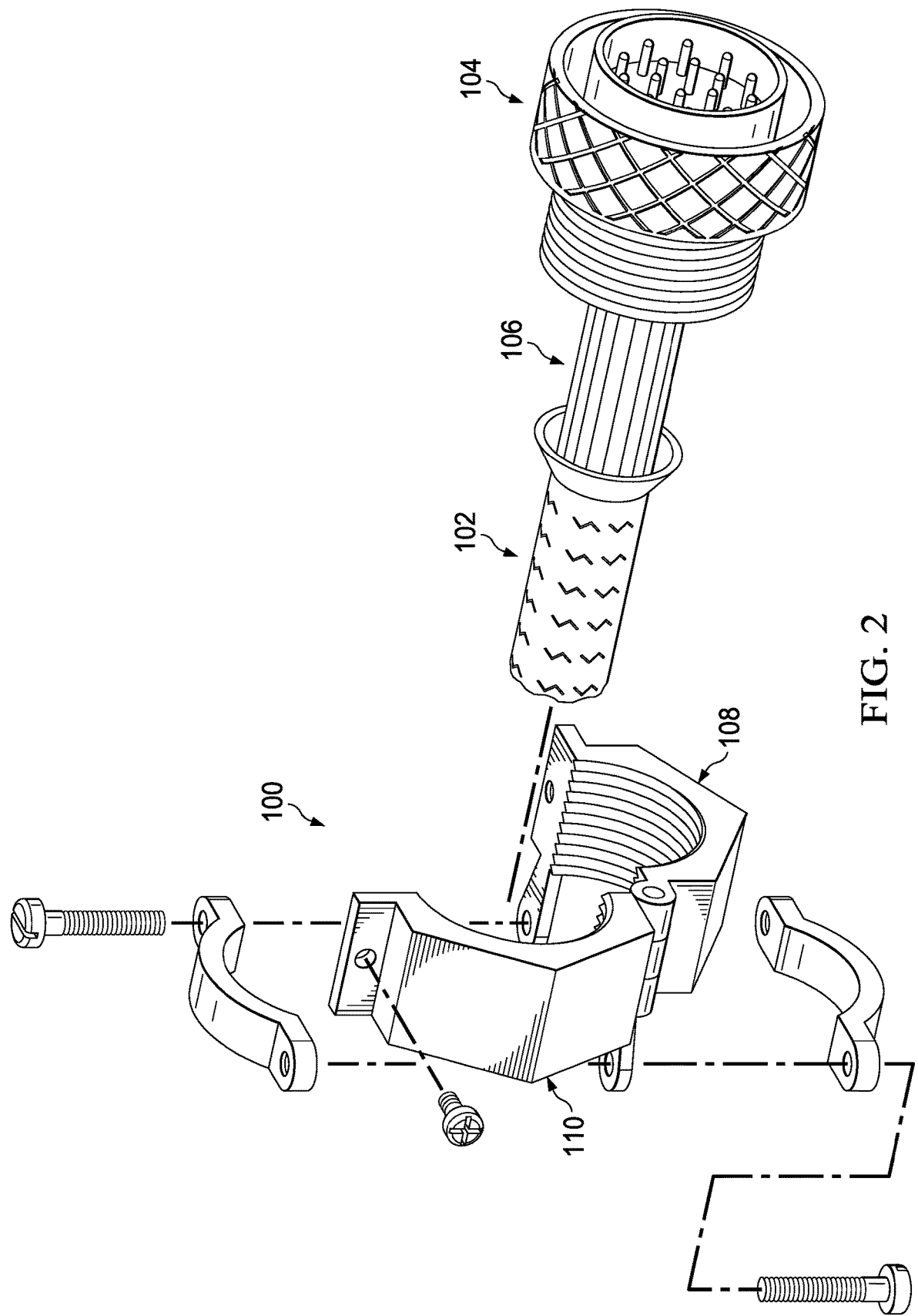
Figure 3:
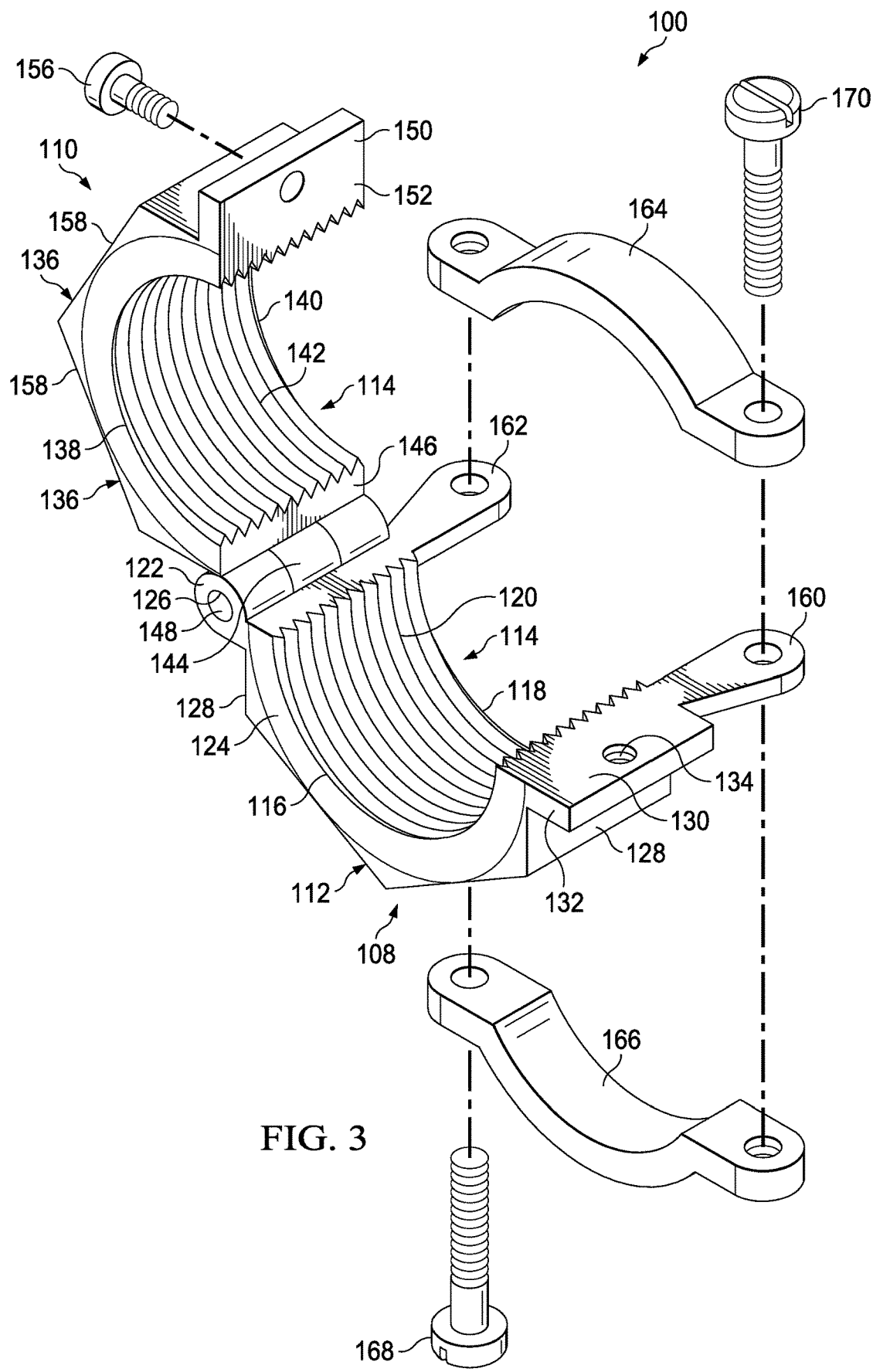
Figure 4:
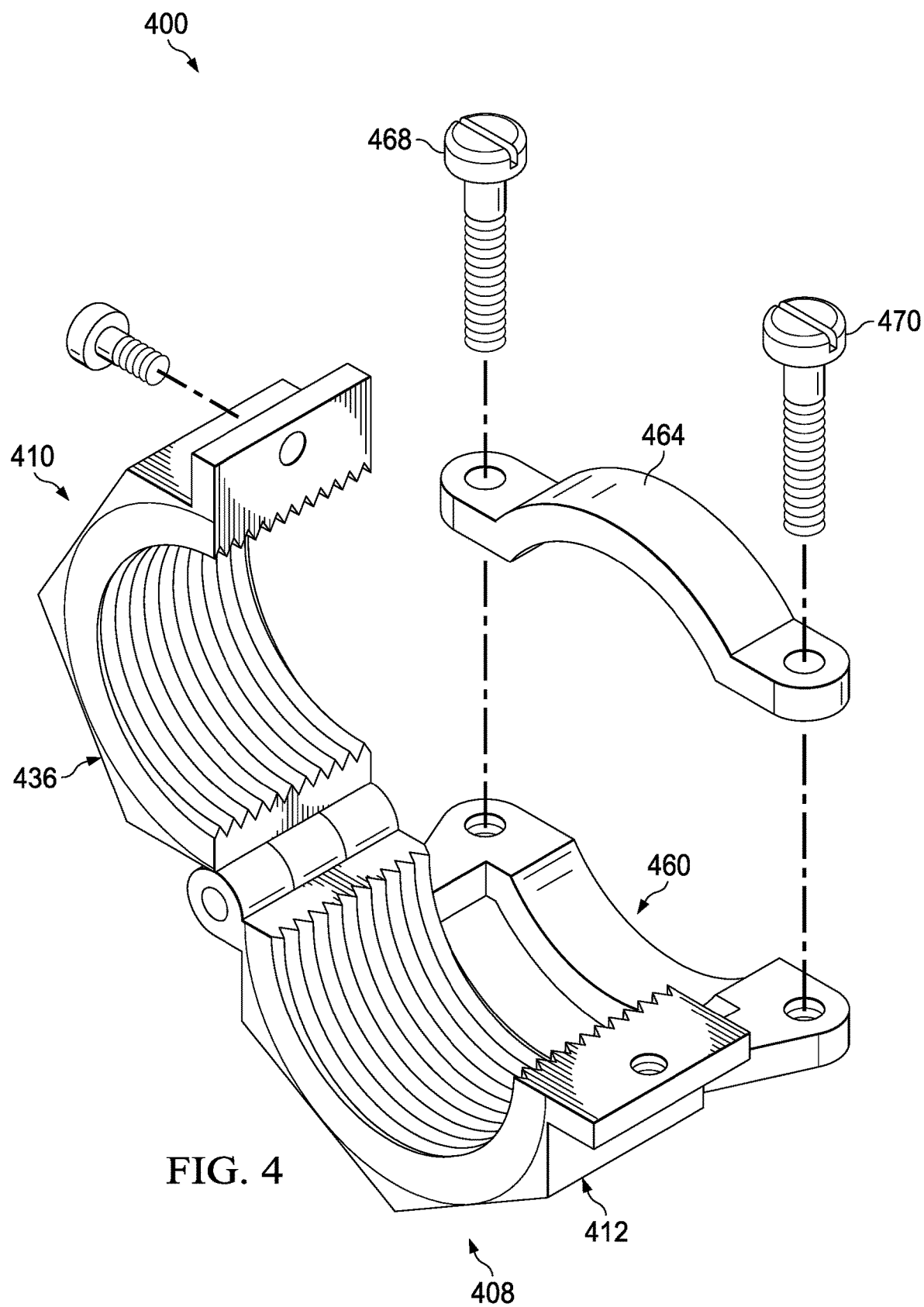
Figure 5:
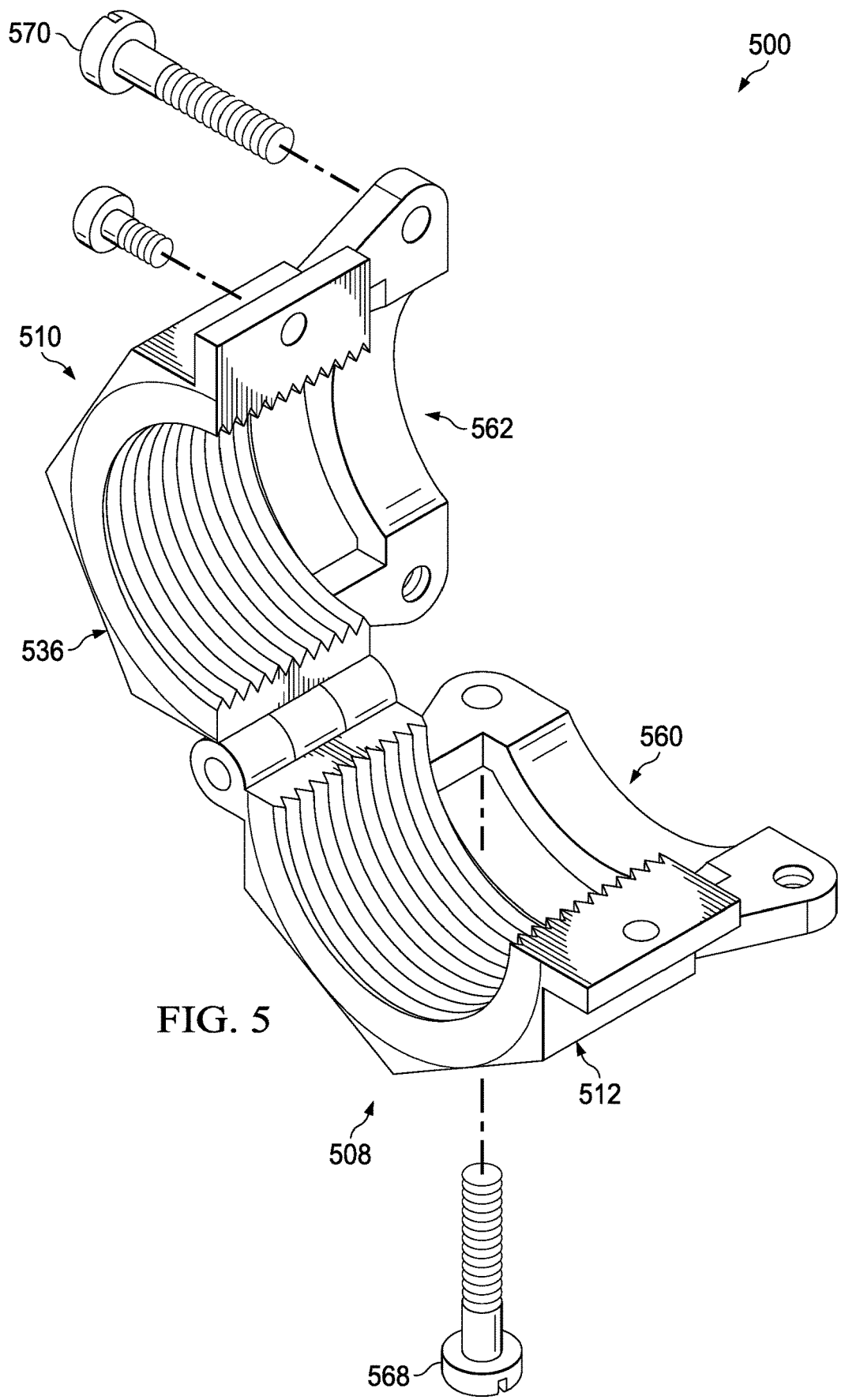
Figure 6:
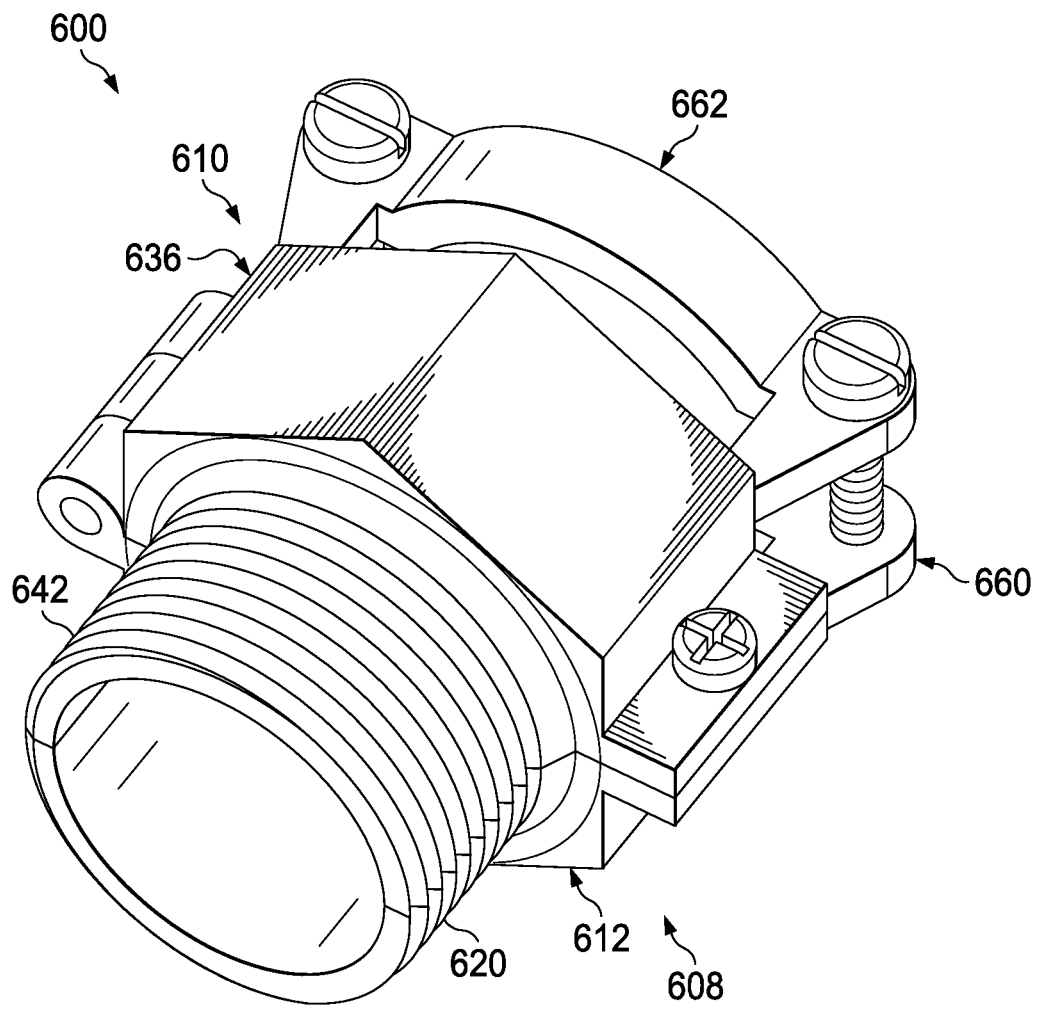
Figure 7:
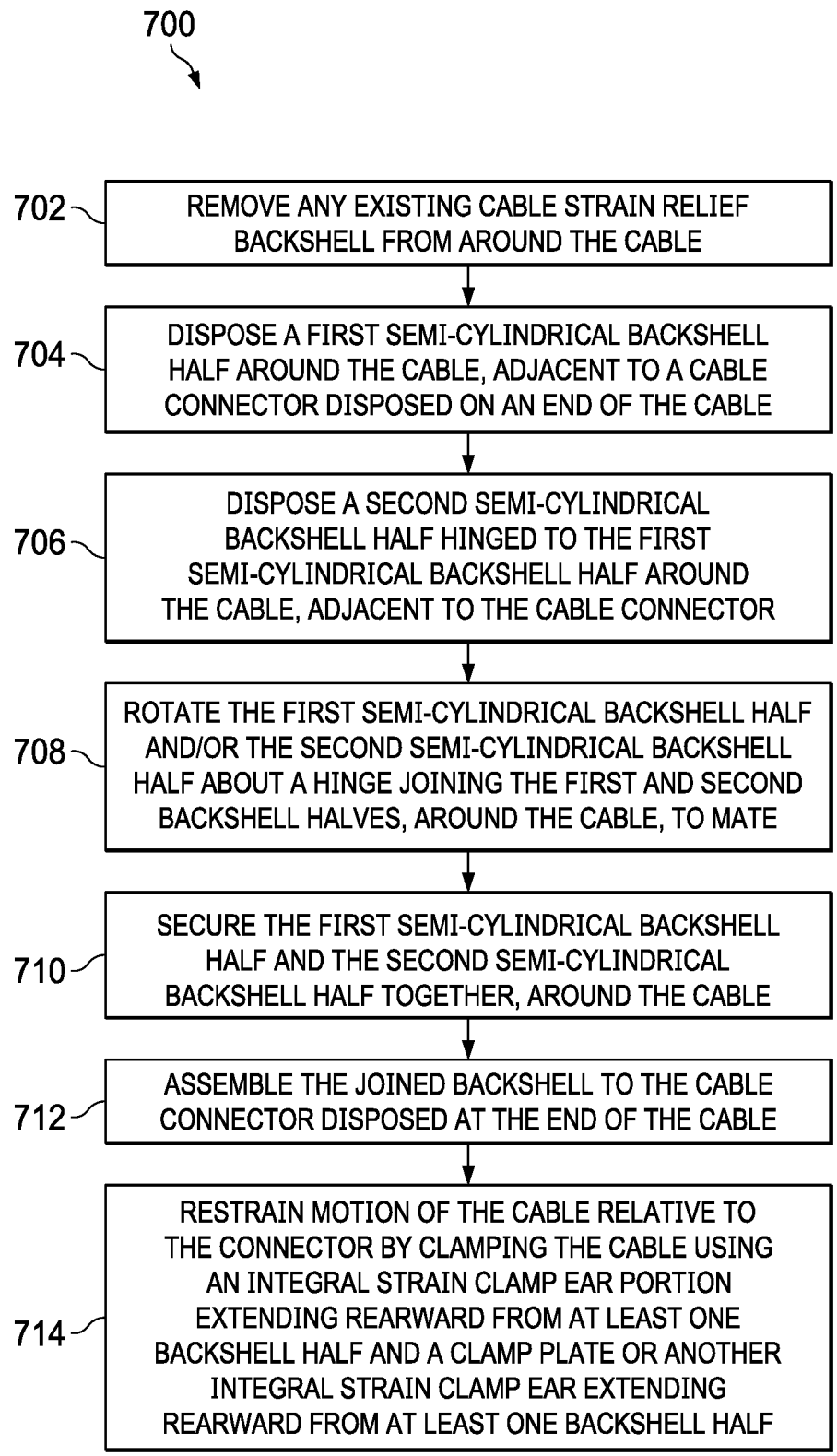

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

FIG. 1 is an exploded environmental perspective view of an example of the present hinged connector strain relief backshell deployed in connection with an electrical/electronics cable, in accordance with some embodiments;

FIG. 2 is an exploded environmental reverse angle, perspective view of the example of the present hinged connector strain relief backshell shown in FIG. 1, also deployed in connection with the electrical/electronics cable, in accordance with some embodiments;

FIG. 3 is an enlarged partially exploded perspective view of an example of a hinged connector strain relief backshell, in accordance with some embodiments;

FIG. 4 is an enlarged partially exploded perspective view of another example of the hinged connector strain relief backshell in accordance with some embodiments;

FIG. 5 is an enlarged partially exploded perspective view of a further example hinged connector strain relief backshell, in accordance with some embodiments;

FIG. 6 is an enlarged perspective view of an example external threaded hinged connector strain relief backshell, in accordance with some embodiments; and FIG. 7 is a flowchart of a method for cable strain relief employing the present a hinged connector strain relief backshell, according to various embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present hinged connector strain relief backshells and related systems and methods are generally employed in the fields of electronics and electrical systems and relate specifically to wire harness connector strain reliefs, particular wire harness connector strain reliefs configured for use in aircraft.

As noted, backshells are used to provide support and strain relief to the connector end of a wiring harness, or the like. Embodiments of the present hinged connector strain relief backshells and related systems and methods utilize a saddle clamp structure, to provide clamping force onto a wire harness, or the like, prior to the wiring harness entering the connector. Embodiments of the present hinged connector strain relief backshell is hinged on one side to enable the user to replace the backshell without the removal of the entire connector. This improves maintenance turnaround times, reduce wire harness failures from additional manipulation of, disassembly of and/or strain placed on wire harness during maintenance, etc. Also, the hinge reduces the amount of individual parts, particularly compared to two-piece strain relief backshell assemblies, or the like, reducing associated Foreign Object Debris (FOD) risks. Embodiments of the present hinged connector strain relief backshells and related systems and methods utilize a hinge on one side of the backshell to enable quick removal and replacement of the backshell. During installation, the hinged backshell is placed over the wiring harness, then closed around the wire harness, and secured closed with one or more fasteners and the hinged backshell is mated together by a fastener, on the opposite side of the hinge. Once installed, the hinged backshell functions to provide strain relief preventing uncoupling of an associated connector, or individual cable elements within the connector, due to tugging and/or bending of the cable that may otherwise result in separation of cable element wires from a connector assembly, shorting of wires within a cable connector assembly, or the like.

In accordance with embodiments of the present systems and methods, a hinged strain relief backshell, selectively disposed about a cable, adjacent to a cable connector for selective assembly with the connector, includes a first integral semi-cylindrical backshell half and a second integral semi-cylindrical backshell half second hinged to the first integral backshell half. The integral semi-cylindrical backshell halves configured to be to be selectively disposed about the cable with one another. Each integral semi-cylindrical backshell half defining complementary half-threads defined by the respective backshell half and corresponding wrench flats defined in an outside surface portion of each backshell half. At least one of the integral semi-cylindrical backshell halves defining at least one strain clamp ear portion extending from a connector distal portion of the backshell half for retraining the cable at least in a direction parallel to the cable.

FIG. 1 is a partially exploded environmental perspective view showing an example embodiment of hinged connector strain relief backshell 100 deployed in conjunction with electrical/electronics cable 102. FIG. 2 is a partially exploded environmental reverse-angle perspective view showing example hinged connector strain relief backshell 100 deployed in conjunction with electrical/electronics cable 102. While embodiments of the present hinged connector strain relief backshell may be used to provide strain relief in conjunction with any number of cable configurations, including wire rope cable, electrical conductor cables, etc., the hinged connector strain relief backshell will be described herein in conjunction with a multi-conductor electronics signal and/or power cable such as illustrated in FIG. 1 (i.e. a multi-element electrical/electronics cable comprising a connector, often referred to as a "cannon plug," providing a conductor for each cable element). To wit, in FIG. 1, an example cable and connector assembly is shown, which includes cable 102, which has connector 104 disposed on end 106 of cable 102. In accordance with embodiments of the present systems and methods hinged strain relief backshell 100 is shown (partially) deployed in conjunction with the cable spaced apart from connector 104, along the body of cable 102.

Example hinged connector strain relief backshell embodiment 100 may best be seen in FIG. 3, a partially exploded perspective view. Other embodiments of hinged connector strain relief backshells are shown in FIGS. 4 through 6, according to some embodiments. The description below proceeds with reference to FIGS. 1 through 3, referring to hinged connector strain relief backshell embodiment 100, then refereeing back to embodiments 400, 500 and 600 in respective FIGS. 4 through 6, below. However, like parts of the hinged connector strain relief backshell embodiments are similarly numbered throughout.

Hinged connector strain relief backshell 100 comprises first integral backshell half 108, hinged to second integral backshell half 110, of a similar, generally "reflected" configuration. Thus, each integral backshell half, 108 and 110, will be described herein.

Referring to FIG. 3, first integral backshell half 108 comprises first integral, generally hollow, semi-cylindrical backshell body portion 112 adapted to be disposed proximal to connector 104. The first backshell body portion 112, in turn defines a portion (i.e. a first half of) axial connector receptive central opening 114. axial connector receptive central opening 114 extends from connector-proximal end 116 of backshell body portion 112 to connector distal end 118 of backshell body portion 112. First half-threads 120 are defined on an inner surface of first semi-cylindrical backshell body portion 112.

First hinge half portion 122 extends generally normal to (i.e. generally perpendicular from) first semi-cylindrical backshell body portion 112, from first end 124 of first semi-cylindrical backshell body portion 112. This first hinge half portion defines at least one hinge pin receptive orifice 126 that extends generally longitudinal with, or parallel to, an axis of first semi-cylindrical backshell body portion 112. Further, first wrench flats 128 are defined in an outside surface portion of the semi-cylindrical backshell body portion 112.

First closure flange portion 130 extends generally normal to (i.e. generally perpendicular from) first semi-cylindrical backshell body portion 112 from second end 132 of first semi-cylindrical backshell body portion 112. This first closure flange portion defines first fastener receptive orifice 134, extending generally tangent to first semi-cylindrical backshell body portion 112, and hence extending generally perpendicular to first closure flange portion 130.

Second integral backshell half 110 comprises second integral, generally hollow, semi-cylindrical backshell body 136, also adapted to be disposed proximal to connector 104. Second backshell body portion 136 defines the remainder (i.e. the second half) of axial connector receptive central opening 114, which, extends from connector-proximal end 138 of second backshell body portion 136 to connector distal end 140 of second backshell body portion 136. Second half-threads 142 are defined on an inner surface of second semi-cylindrical backshell body portion 136, complementary to half-threads 120 defined on an inner surface of first semi-cylindrical backshell body portion 112.

Second hinge half portion 144 extends generally normal to (i.e. generally perpendicular from) second semi-cylindrical backshell body portion 136, from first end 146 of second semi-cylindrical backshell body portion 136 and defines at least one hinge pin receptive orifice, extending generally parallel to an axis of second semi-cylindrical backshell body portion 136, complementary to hinge pin receptive orifice(s) 126 defined by first hinge half portion 122. Thereby, in accordance with various embodiments of the present hinged connector strain relief backshell, hinge pin 148 is deployed through the first and second hinge pin receptive orifices to hinge first and second integral backshell halves, 108 and 110, to one another.

Second closure flange portion 150 extends generally normal to second semi-cylindrical backshell body portion 136, from second end 152 of second semi-cylindrical backshell body portion 136, corresponding to first closure flange portion 130 of first semi-cylindrical backshell body portion 112. Second closure flange portion 150 defines second fastener receptive orifice 154, generally tangent to second semi-cylindrical backshell body portion 136. One of first or second closure flange portion orifice 134 or 154 may define threads, while the other closure flange portion orifice may be large enough to allow fastener 156 to pass through and be threaded into the threaded flange orifice to close backshell 100. Second wrench flats 158, which correspond with first wrench flats 128, are defined in an outside surface portion of second semi-cylindrical backshell body portion 136.

At least one strain clamp ear portion (160 and/or 162) extends rearwardly, and/or at an angle, from a connector distal portion of first or second semi-cylindrical backshell body 108 or 110, parallel to an axis of semi-cylindrical backshell body portion 112 or 136. In certain embodiments an ear portion may extend from each backshell half. At least one clamp plate (164 and/or 166) adapted to be secured by at least one fastener (168 and/or 170) to strain clamp ear portion(s) 160 and/or 162, capturing and securing cable 102, restraining motion of cable 102 in a direction parallel to the cable preventing the cable from pulling out of connector 104, uncoupling of individual cable elements within the connector, and/or bending that may otherwise result in separation of cable element wires from a connector assembly, shorting of wires within a cable connector assembly, or the like.

In an alternative embodiment, illustrated in FIG. 4 one of first or second semi-cylindrical backshell half 408 or 410 of hinged connector strain relief backshell 400 defines strain clamp ear and saddle 460 extending rearwardly, and/or at an angle, from a connector distal portion of one of first or second semi-cylindrical backshell body portion 412 or 436, generally parallel to an axis of hinged backshell 400. Therein, one clamp plate 464 is adapted to be secured by at least one fastener (468 and/or 470) to strain clamp ear and saddle 460, capturing and securing cable 102, restraining motion of cable 102 in a direction parallel to the cable preventing the cable from pulling out of connector 104 uncoupling of individual cable elements within the connector, and/or bending that may otherwise result in separation of cable element wires from a connector assembly, shorting of wires within a cable connector assembly, or the like In another alternative embodiment, illustrated in FIG. 5 each of first and second semi-cylindrical backshell halves 508 and 510 of hinged connector strain relief backshell 500 define strain clamp ear and saddles 560 and 562 extending rearwardly, and/or at an angle, from a connector distal portion of each of respective first and second semi-cylindrical backshell body portions 512 and 536, generally parallel to an axis of semi-cylindrical backshell halves 508 and 510. Therein, when first and second semi-cylindrical backshell halves 508 and 510 are hinged together to mate, strain clamp ear portions 560 and 562 capture cable 102 between them, restraining motion of cable 102 in a direction parallel to the cable preventing the cable from pulling out of connector 104 uncoupling of individual cable elements within the connector, and/or bending that may otherwise result in separation of cable element wires from a connector assembly, shorting of wires within a cable connector assembly, or the like. Strain clamp ear and saddles 560 and 562 may be further secured together by fasteners 568 and 570, or the like, to more securely capture cable 102 between strain clamp ear and saddles 560 and 562 and thereby more securely restraining motion of cable 102 in a direction parallel to the cable preventing the cable from pulling out of connector 104 and/or the like, as described above.

FIG. 6 is an enlarged perspective view of example external threaded hinged connector strain relief backshell 600, in accordance with some embodiments. Such further alternative embodiments may implement external threads with respect to any of the above-described embodiments. FIG. 6 illustrates example external threaded hinged backshell embodiment 600, wherein each of the first and second semi-cylindrical backshell halves 608 and 610 of hinged connector strain relief backshell 600 define external half threads 620 and 642 on an outside of the first and second semi-cylindrical backshell half body portions 612 and 636 to define external male threads for assembly into a connector (104) defining internal threads.

In accordance with embodiments of the present systems and methods at least one of body portions 112 and/or 136/412 and/or 436/512 and/or 536/612 and/or 636, including ears and/or saddle portions 160 and 162/460/560 and 562/660 and 662, or just ear and/or saddle portions 160 and 162/460/560 and 562/660 and 662, may be angled to accommodate a bend in cable 102 near connector 104, such at or near end 106. Such angled backshell embodiments may have at least one extended body portion 112 and/or 136/412 and/or 436/512 and/or 536/612 and/or 636 extending at a preselected bend angle chosen to accommodate an intended cable deployment angle. This angle may generally vary between zero and ninety degrees but may be greater, as necessary got cable deployment. Such an extended body portion may, in accordance with the present systems and methods, be hinged and may employ additional corresponding closure flanges (130 and 150) to secure the angled hinged backshell closed.

Thus, in operation, a hinged connector strain relief backshell (such as FIG. 1 through 6 illustrated hinged connector strain relief backshells 100 and 400 through 700) may be deployed and employed in conjunction with an electrical/electronics cable (102), or the like, in a manner consistent with example method 700 illustrated in the flowchart of FIG. 7. Following any necessary removal of an existing (conventional) strain relief from the cable, such as by cutting a conventional strain relief from around the cable at 702, a first semi-cylindrical backshell half (108), such as described above, is disposed around a cable, adjacent to a cable connector, at 704. That is, if removal of an existing (strain relief) backshell is called for, prior to disposing the first backshell halves around the cable at 704, the existing backshell 1 may first be unclamped from the cable, then unscrewed from the connector. The existing backshell may then be removed from around the cable. If the existing backshell is not hinged, removal may comprise cutting the existing cable strain relief backshell to allow removal at 702. However, if the existing cable strain relief backshell is hinged in accordance with the present systems and methods, removal may call for unsecuring a first semi-cylindrical backshell half and a second semi-cylindrical backshell half of the existing hinged backshell from each other, then the existing backshell is hinged open, prior to removing the existing backshell from around the cable at 702.

At 706, a second semi-cylindrical backshell half (110), hinged to the first backshell half, such as described above, is also disposed around the cable, adjacent to the cable connector (e.g. as the first semi-cylindrical backshell half (108) is disposed around the cable). The first semi-cylindrical backshell half and/or the second semi-cylindrical backshell half are then rotated about the hinge of the hinged connector strain relief backshell (100), at 708, to mate the first and second hinged connector strain relief backshell halves, around the cable. At 710, the first semi-cylindrical backshell half is joined (i.e. secured) to the second semi-cylindrical backshell half, around the cable, such as by securing a fastener through first and second closure flange portion fastener receptive orifices (134 and 154) defined by a closure flange extending from each backshell half.

The joined backshell is assembled with the (cable) connector (104) at the end of the cable, at 712, such as by screwing threads (provided by mated half-threads 120, 142, 642, etc.) of each half onto or into threads defined by the connector. The joined backshell may be tightening to the cable connector as a part of assembly at 712, by engaging complementary wrench flats defined in an outside surface portion of each of the first and second semi-cylindrical backshell halves with an appropriately sized wrench and tightening the backshell into or onto the connector.

Thereafter, the cable is clamped between clamp plate(s) (164 and 166) and to (a) strain clamp ear portion(s) (160 and 162) extending rearward, and/or at an angle, from at least one of the backshell halves, clamped between a clamp plate (464) and a strain clamp saddle (460) extending from one of the backshell halves, or between strain clamp saddles (560 and 562) extending from the e backshell halves, or the like, at 714. This captures and secures the cable, restraining motion of the cable relative to the connector, at least in a direction parallel to the cable. Thereby, the installed hinged connector strain relief backshell prevents uncoupling of the connector and/or individual cable elements within the connector, due to tugging on the cable and/or bending of the cable, that may also otherwise result in separation of cable element wires from the cannon plug, shorting of wires within the cannon plug, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hinged cable strain relief backshell comprising:
a first integral semi-cylindrical backshell half comprising:
half-threads defined by the first backshell half;
first wrench flats defined in an outside surface portion of the first backshell half;
at least one strain clamp ear portion of the integral first backshell half extending from a connector distal portion of the integral first backshell half; and
a strain clamp saddle portion of the integral first backshell half extending from the at least one strain clamp ear portion of the integral first backshell half; and
a second integral semi-cylindrical backshell half hinged to the first integral backshell half and configured to be secured to the first integral backshell half, the second integral backshell half comprising:
half-threads defined by the second backshell half, complementary to the half-threads defined by the first backshell half; and
second wrench flats, corresponding with the first wrench flats, defined in an outside surface portion of the second backshell half.

2. The hinged cable strain relief backshell of claim 1, wherein the half threads comprise respective complimentary half-threads defined on an inner surface the respective first integral semi-cylindrical backshell half and second integral semi-cylindrical backshell half.

3. The hinged cable strain relief backshell of claim 1, wherein the half threads comprise respective complimentary half-threads defined on an outer surface the respective first integral semi-cylindrical backshell half and second integral semi-cylindrical backshell half.

4. The hinged cable strain relief backshell of claim 1, wherein the first integral semi-cylindrical backshell half and the second integral semi-cylindrical backshell half each define a respective hinge half portion extending generally normal to the respective semi-cylindrical backshell half, from a first end of each semi-cylindrical backshell half, each hinge half portion defining at least one hinge pin receptive orifice extending generally parallel to an axis of the respective semi-cylindrical backshell half, the hinged cable strain relief backshell further comprising a hinge pin deployed through the hinge pin receptive orifices, hinging the first backshell half and the second backshell half to each other.

5. The hinged cable strain relief backshell of claim 1, wherein the first integral semi-cylindrical backshell half and the second integral semi-cylindrical backshell half each define a respective corresponding closure flange portion extending generally normal to the respective semi-cylindrical backshell half, from a second end of the respective semi-cylindrical backshell half.

6. The hinged cable strain relief backshell of claim 5, wherein each closure flange portion further defines a fastener receptive orifice extending generally tangent to the respective semi-cylindrical backshell half, correspondingly aligning, and configured to receive a fastener when the first backshell half and the second backshell half are closed.

7. The hinged cable strain relief backshell of claim 1, further comprising at least one clamp plate adapted to be secured by at least one fastener to the at least one strain clamp ear portion, capturing and securing a cable, restraining motion of the cable in a direction parallel to the cable.

8. The hinged cable strain relief backshell of claim 1, wherein the second backshell half further comprises at least one strain clamp ear portion extending from a connector distal portion of the second backshell half.

9. The hinged cable strain relief backshell of claim 8, wherein:
the strain clamp saddle portion of the integral first backshell half extending from the at least one strain clamp ear portion of the integral first backshell half further comprises a first strain clamp saddle portion extending from the at least one strain clamp ear portion of the integral first backshell half extending from the connector distal portion of the integral first backshell half; and
the integral second backshell half further comprises a second strain clamp saddle portion of the integral second backshell half extending from the at least one strain clamp ear portion of the integral second backshell half extending from the connector distal portion of the integral second backshell half.

10. A cable assembly comprising;
a cable;
a connector disposed on an end of the cable; and
a hinged strain relief backshell configured to be selectively disposed about the cable and selectively assembled with the connector, the hinged strain relief backshell comprising:
a first integral semi-cylindrical backshell half configured to be selectively disposed about the cable, the first backshell half comprising:
half-threads defined by the first backshell half;
first wrench flats defined in an outside surface portion of the first backshell half;
at least one strain clamp ear portion of the integral first backshell half extending from a connector distal portion of the integral first backshell half; and
a strain clamp saddle portion of the integral first backshell half extending from the at least one strain clamp ear portion of the integral first backshell half; and
a second integral semi-cylindrical backshell half hinged to the first integral backshell half and configured to be to be selectively disposed about the cable with the first backshell half and to be secured to the first integral backshell half, the second integral backshell half comprising:
half-threads defined by the second backshell half, complementary to the half-threads defined by the first backshell half; and
second wrench flats, corresponding with the first wrench flats, defined in an outside surface portion of the second backshell half.

11. The cable assembly of claim 10, further comprising a clamp plate selectively secured by at least one fastener to the at least one strain clamp ear portion, capturing and securing the cable, to restrain motion of the cable in a direction parallel to the cable.

12. The cable assembly of claim 10, further comprising at least one further strain clamp saddle portion of the integral second backshell half, each extending from at least one strain clamp ear portion of the integral second backshell half extending from a connector distal portion of the integral second backshell half.

13. The cable assembly of claim 10, wherein the half threads comprise respective complimentary half-threads defined on an inner surface the respective first integral semi-cylindrical backshell half and second integral semi-cylindrical backshell half.

14. The cable assembly of claim 10, wherein, wherein the half threads comprise respective complimentary half-threads defined on an outer surface the respective first integral semi-cylindrical backshell half and second integral semi-cylindrical backshell half.

\* \* \* \* \*